United States Patent
Schulze

(10) Patent No.: US 6,892,756 B2
(45) Date of Patent: May 17, 2005

(54) GAS FLOW MONITORING DEVICE

(75) Inventor: Klaus Schulze, Gernrode (DE)

(73) Assignee: Mertik Maxitrol GmbH & Co. KG, Thale (DE)

(*) Notice: Subject to any disclaimer, the term of this patent is extended or adjusted under 35 U.S.C. 154(b) by 82 days.

(21) Appl. No.: 10/363,455

(22) PCT Filed: Sep. 5, 2001

(86) PCT No.: PCT/EP01/10208
§ 371 (c)(1), (2), (4) Date: Mar. 4, 2003

(87) PCT Pub. No.: WO02/21030
PCT Pub. Date: Mar. 14, 2002

(65) Prior Publication Data
US 2004/0031524 A1 Feb. 19, 2004

(30) Foreign Application Priority Data
Sep. 6, 2000 (DE) .......................... 100 43 811

(51) Int. Cl.⁷ .............................................. F16K 17/30
(52) U.S. Cl. ........................................................ 137/517
(58) Field of Search ................................ 137/517, 498

(56) References Cited

U.S. PATENT DOCUMENTS

| | | | | |
|---|---|---|---|---|
| 920,716 A | * | 5/1909 | Beckman | 137/513.3 |
| 2,165,649 A | * | 7/1939 | Parsons | 137/199 |
| 2,404,924 A | * | 7/1946 | Sacchini | 137/512 |
| 2,834,377 A |   | 5/1958 | Bragg |   |
| 3,693,652 A |   | 9/1972 | Iung |   |
| 3,794,077 A |   | 2/1974 | Fanshier |   |
| 5,293,898 A |   | 3/1994 | Masloff |   |

FOREIGN PATENT DOCUMENTS

| | | |
|---|---|---|
| DE | 35 31 175 A | 3/1987 |
| DE | 298 18 904 U 1 | 1/1999 |
| GB | 556 863 A | 10/1943 |
| WO | 92/01184 | 1/1992 |

OTHER PUBLICATIONS

International Search Report; PCT/EP01/10208; ISA/EPO, Dec. 19, 2001.

* cited by examiner

*Primary Examiner*—Stephen M. Hepperle
(74) *Attorney, Agent, or Firm*—Harness, Dickey & Pierce, P.L.C.

(57) ABSTRACT

There is to be created a gas flow monitoring device in which the adjustment/alteration of the reseat flow can also be made without the need of changes to its design, that is to say even after its manufacture. In particular, it should be possible to adjust the reseat flow at the time of its installation on site. To this end, the gas flow monitoring device consists of a gas-tight casing (1) with a valve seat (6) in its interior for a reseat body (14) that can freely move inside the casing (1). Said reseat body (14) is fastened to a pin (11) that is supported by bearings located in both the inlet guide (7) and the outlet guide (8). Said reseat body (14) is kept in open position by a reseat spring (16) that rests with its one end on the outlet guide (8) and with its other end on the reseat body (14) itself. At the inlet guide (7) there is arranged a spacer block (17) that acts as a stop point (18) for the reseat body (14) with the gas flow monitoring device in open position.

2 Claims, 4 Drawing Sheets

GAS FLOW MONITORING DEVICE

CROSS REFERENCE TO RELATED APPLICATIONS

Figure 1:
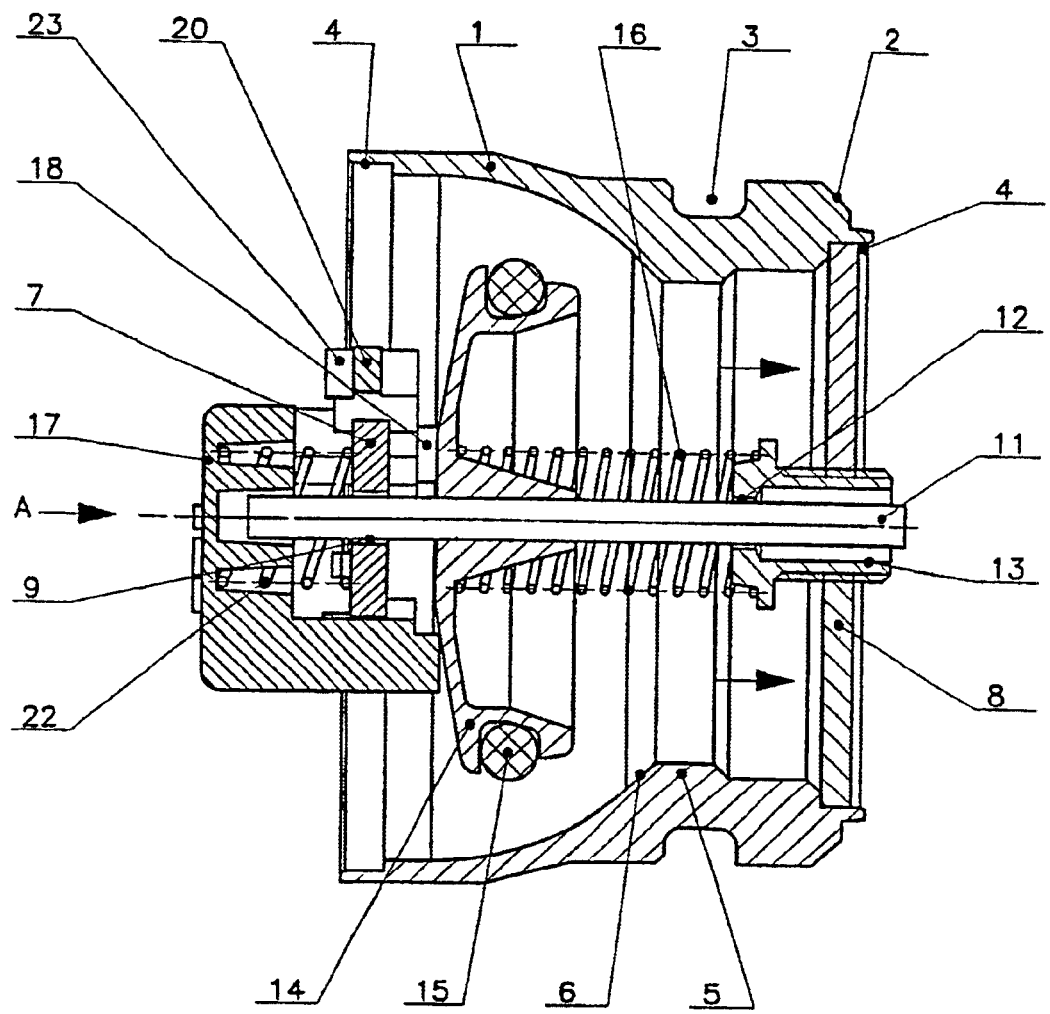

The disclosures in German Application No. 100 43 811.3, filed 6 Sep. 2000, and International Application No. PCT/EP01/10208, filed 5 Sep. 2001 are hereby incorporated by reference.

TECHNICAL FIELD

The invention relates to a gas flow monitoring device that automatically shuts off gas pipes in the event of an inadmissible flow increase.

PRIOR ART

Gas flow monitoring devices of that kind, employed in pipelines, e.g. upstream of gas valves, gas appliances, etc., are available in a large variety of designs. Their purpose is to discontinue gas supply if gas consumption exceeds a predefined value.

WO 92/01184, for instance, describes a gas flow monitoring device of the above-mentioned type which in case of damage shuts a pipe system but does not effect a premature shutting off of the supply line if a consumer requires the gas volume corresponding to its rated output over a longer period. One valve in this safety shut-off device is designed as a disk valve.

In said design, the valve body is fixed to a valve shank that is movably arranged on either side in slide bearings in axial valve direction and opposing the force of a spring. The valve disk is jointly acting with a valve seat supported by two flat rings which at the same time serve as joints for the above-mentioned slide bearings. The flat rings are provided with cut-outs or breakthroughs.

As each flow value corresponds to a pre-defined pressure drop at the open valve, the operating point at the characteristic line of pressure drop and/or the safety shut-off device's characteristic line of pressure drop must be shifted in order to exactly adapt the reseat flow to the type, nature and number of consumers.

To do this, the spring's springiness and/or the valve's reseating path can be adjusted. For adjusting the valve's reseating path a nut is screwed to a thread on the valve shank provided at its free end. An adjusting device formed, e.g. by a second nut between the two slide bearings, is provided to enable adjustment of springiness.

Also known from GB Patent 556,863 is an automatic shut-off valve. This shut-off valve consists of a tube-shaped casing with threaded connections on either side. The casing is fitted with a flat ring with breakthroughs, which ring has at its centre a slide bearing for a longitudinally moving valve shank with a valve gate at one of its ends which acts together with a valve seat inside the casing. A pressure spring, that is supported on one side by the valve gate and at the other one by the flat ring, keeps the valve gate in the open position until the pre-set reseat flow is achieved. In this design, the reseat flow is changed by a modification of the springiness adjustment by altering the reach of the threaded valve shank inside a bonnet, and thus the installation length of the spring.

A valve described in U.S. Pat. No. 3,794,077 has a similar set-up. A pressure spring, with breakthroughs, supported on one side by a slide bearing at the casing and on the other one by a nut screwed to the valve shank keeps the valve gate in open position until the pre-set reseat flow is achieved. Also there, a change in the nut position, which is secured against turning with a pin, on the valve shaft effects an alteration of the installation length of the pressure spring, which in turn alters the reseat flow by said change of springiness.

The disadvantage of all those solutions is that a pre-defined reseat flow can only be adjusted by using dedicated setting and testing equipment and, hence, such work is done preferably by the manufacturer at the time of producing said safety shut-off devices. So, a specific set-up right on the site of installation as might be desired by the responsible installation firm is virtually impossible. In order to achieve the highest possible safety, it is desirable—or sometimes even required—that the reseat flow value of the safety shut-off device employed is a function of the nominal flow value, and, therefore, a relatively high number of specific gas flow monitoring devices must be made available. This, in turn, results in increased manufacturing and warehousing costs.

DESCRIPTION OF THE INVENTION

The invention is focusing on the issue of developing a gas flow monitoring device of the described type in which the adjustment/alteration of the reseat flow can also be made without the need of changes to its design, such as use of different springs depending on the desired reseat flow value, that is to say even after its manufacture. In particular, it should be possible to adjust the reseat flow after the valve has left the production facility, preferably at the time of its installation on site. According to the present invention the problem is solved by arranging a spacer block at the inlet mechanism which acts as a limit stop for the reseat body with the gas flow monitoring device in open position.

Thus, a solution has been found that removes the disadvantages of the prior art according to which adjustment of a pre-defined reseat flow—taking into account the time and money required to do so—was preferably done by the manufacturers of such safety shut-off devices at the time of their production.

Further advantageous arrangements of the invention are described in the other patent claims. For example, it has proved especially favourable if the spacer block is equipped with a lock-in grid by which the spacer block can catch and take hold behind the collars provided at the inlet guide and in this way secure the spacer block in its position against the force of a spring that rests with its one side at the inlet guide opposite to the reseat body and with its other side on the spacer block itself.

To be able to adjust only one spacer block to several different reseat flow values, another arrangement provides, for example a lock-in grid with different lock-in positions each of which can be activated to interlock by turning the spacer block by a turning angle that is specifically assigned to such lock-in position, whereby the position of the limit stop in relation to the reseat body in open position can be altered along the longitudinal axis of the pin depending on said lock-in position.

In this connection it has proved especially favourable that unintentional resetting of the pre-set value is avoided as the spacer block is provided with a locking piston which, however, is disabled in case the spacer block is moved against the force of the spring in order to intentionally alter the pre-set value.

There is another favourable arrangement in which the spacer block is always held within the inlet guide as the spacer block is provided with resilient lips assigned to each of the inlet guide's collars and in this way enable said collars to trip, whereat the tappets that also are specifically assigned to each of the inlet guide's collars prevent their pushing out.

PRACTICAL EXAMPLE

Figure 2:
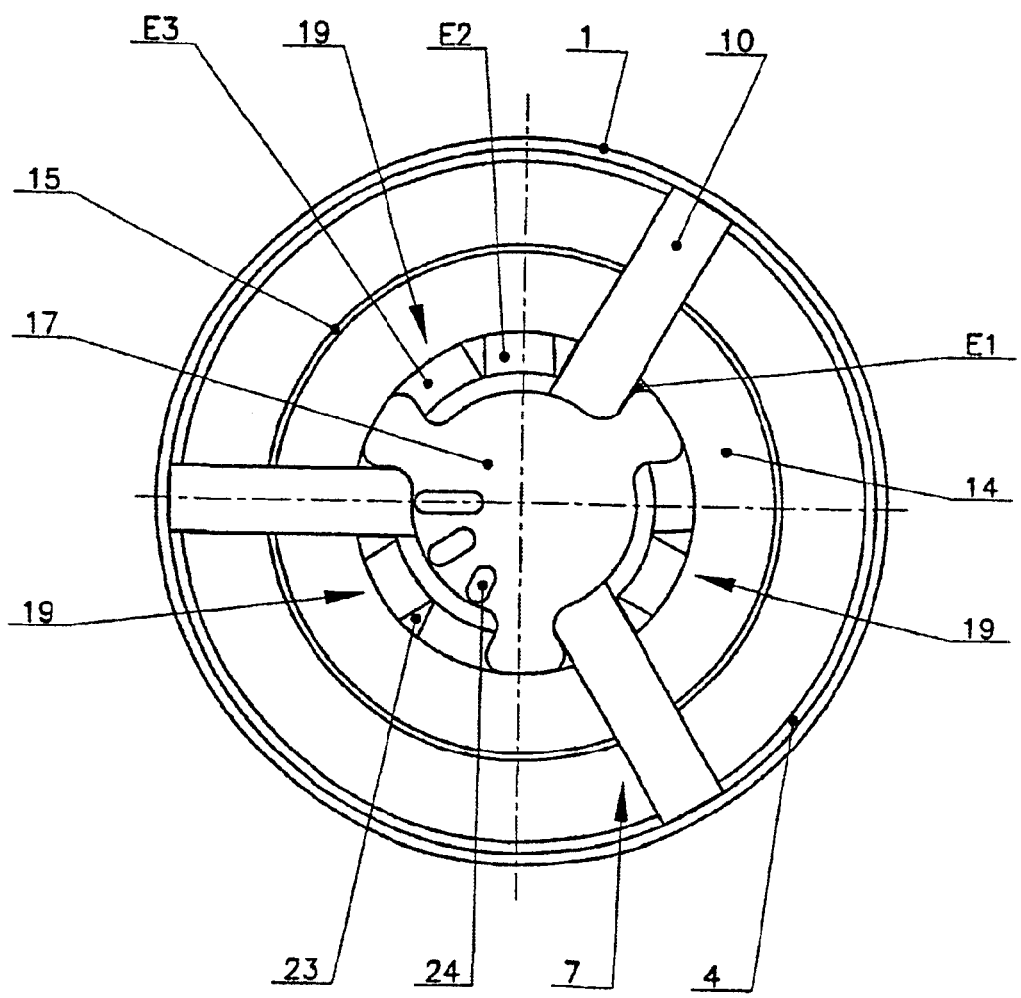
Figure 3:
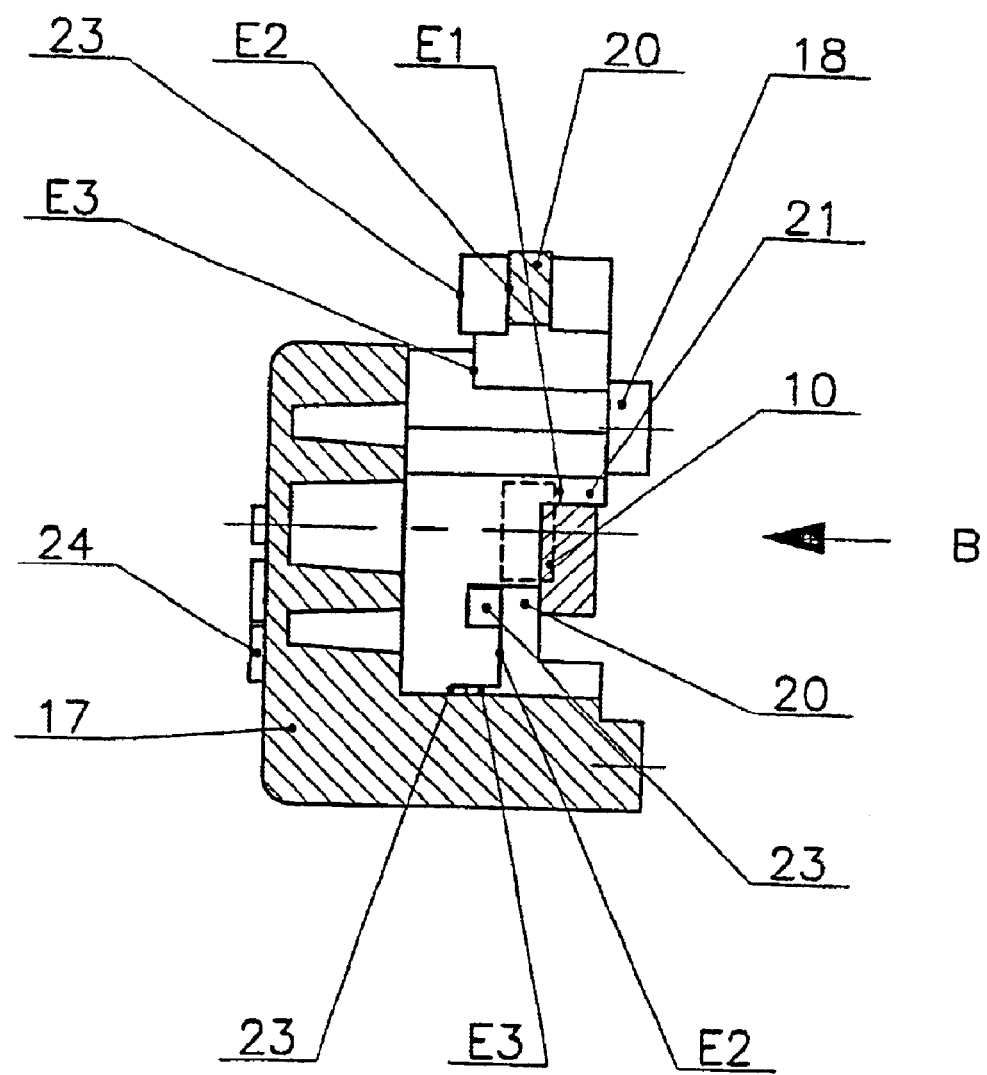
Figure 4:
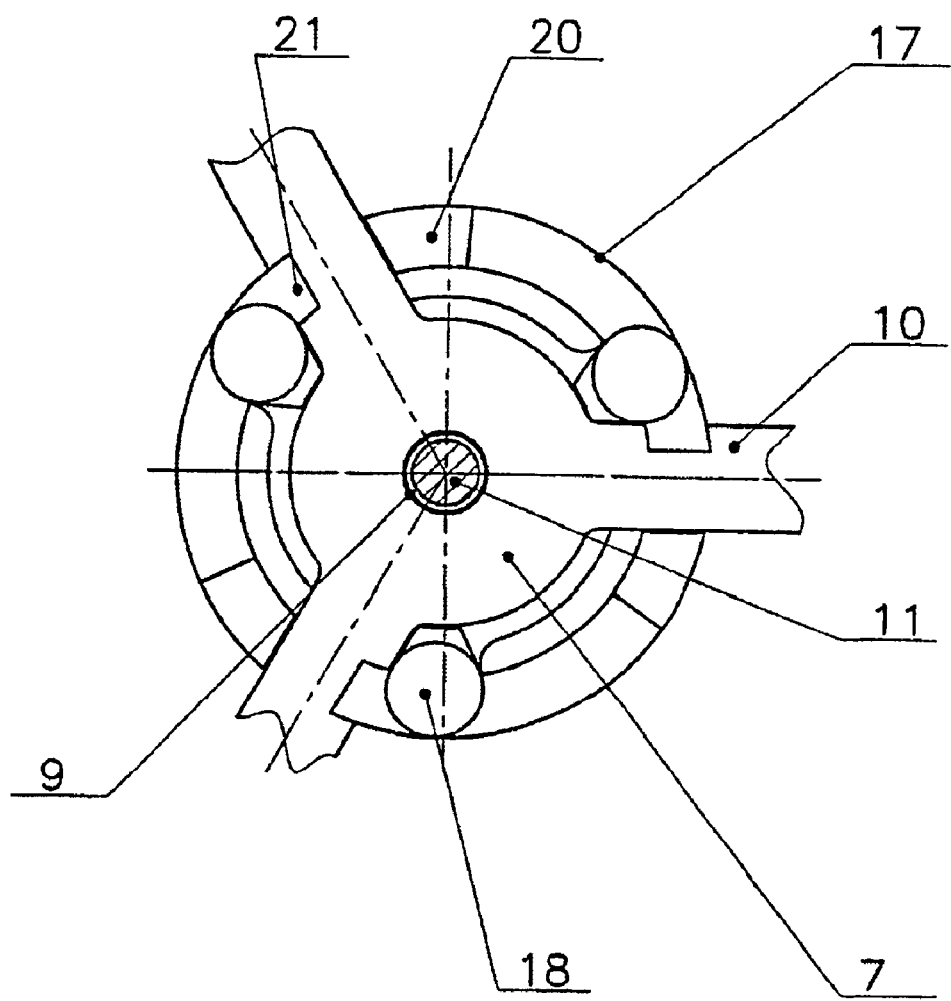

Below is a more detailed description of the invention by means of a practical example. The figures show the following:

FIG. 1 a gas flow monitoring device according to the invention as a schematic sectional view in open position;

FIG. 2 an A view of the gas flow monitoring device according to FIG. 1;

FIG. 3 a view of the spacer block according to FIG. 1;

FIG. 4 an A view of the spacer block according to FIG. 3.

The gas flow monitoring device according to the invention shown in FIG. 1 has a tube-shaped casing (1) that can be pushed into a not shown gas piping. Advantageously, the casing (1) has an inserting slope (2) to facilitate this. To make sure that the connection between casing (1) and piping exhibits the required gas-tightness, the casing (1) is equipped with a circumferential groove (3) to house an O-ring seal (not shown). It goes without saying that other connection types are possible as well.

The casing (1) has a bore (4) on both its inlet and outlet side. Between the two bores (4), the casing (1) has a neck (5) whose side that faces towards the inlet forms the valve seat (6). An inlet guide (7) and an outlet guide (8) are impressed into the inlet-side and outlet-side bore (4), respectively. In order to keep at a minimum the flow-section reducing areas of both the inlet guide (7) and the outlet guide (8), the latter are preferably designed as sheet metal pre-forms that have three radial collars (10) equidistantly distributed over the circumference (cf. FIGS. 2 & 4). In its centre, the inlet guide (7) has a bearing (9) to house a pin (11) the second bearing (12) of which is formed be an adjusting element (13) screwed into the centre of the outlet guide (8). The bearings (9 & 12) support the pin (11) so that it can move in longitudinal direction, with a reseat body (14) being fastened to said pin, for example by interference fit. The reseat body (14) has a ring-shaped seat to house an O-ring seal (15) that is to act as an elastic sealing element in order to achieve the desired tightness level. A reseating spring (16) rests on said adjusting element (13), whereat the spring's other end keeps the reseat body (14) in open position. The situation of the open position is determined by the spacer block (17) that is arranged on the inlet guide (7) and acts as limit stop to the reseat body's (14) movement, using stop points (18) specifically provided on said spacer block.

To fasten the spacer block (17) at the inlet guide (7), said spacer block is equipped with a lock-in grid (19) each element of which is specifically assigned to one of the ribs (10) behind which the same can catch and take hold (cf. FIG. 2). The resilient lips (20) assigned to each of said collars (10) allow tripping of the latter when mounting the spacer block (17). The collar's (10) situation before such tripping is illustrated in FIG. 3. After such tripping—as also depicted in FIG. 3 in broken lines—the collars (10) are prevented from being pushed out of the spacer block (17) by tappets (21) that are also assigned to said collars (10). The spacer block (17) is secured in its position by the force exercised by spring (22) the one end of which rests on the side of the inlet guide (7) facing away from the reseat body (14), whereat the other one rests on the spacer block (17) itself.

To enable pre-setting of different reseat flow values, each lock-in grid (19) exhibits different lock-in positions (e.g. three in this practical example) that can be activated by appropriate turning at the spacer block (17). The figures included here show the collars in lock-in plane E1 which is advantageously formed by the tappet (21) assigned to it. The two other lock-in planes are shown in FIGS. 2 & 3, and marked wit E2 and E3, respectively, for at least one collar (10) each. In this way, the situation of the stop points (18) is altered, limiting the reseat body's (14) movement in its open position along the pin's (11) longitudinal axis. The marks No (24) provided on the spacer block (17) allow an immediate realisation of the pre-settings made.

To prevent the selected reseat flow adjustment against an unintentional alteration, each individual lock-in plane has a dedicated raised part that acts under the impact of the spring (22) as a locking piston (23). Only when an external force acts against the spring (22) force, the spacer block (17) is moved in longitudinal direction to such an extent that all collars (10) are shifted outside the area where the locking piston (23) has control over them.

The mode of action of the gas flow monitoring device as described in this practical example is as follows:

The gas flow monitoring device is factory-set to a certain reseat flow by making adjustments at the adjusting element (13), using appropriate setting and testing 45 equipment. In order to exactly adapt on site the reseat flow to the type, nature and number of consumers, the reseat body's (14) situation in open position can be altered to set the desired reseat flow by using the appropriate lock-in position of the spacer block (17). By doing so, the gas flow monitoring device's characteristic line of pressure drop is shifted by a more or less significant amount, as well as the operating point (the latter, however, depending on the reseat spring's (16) spring rate), which results in an alteration of the reseat flow value. Subsequently, the gas flow monitoring device is installed into the gas piping so as to be in line with the gas flow direction as marked by arrows in the depiction in FIG. 1, after which it should be in the situation as shown in FIG. 1 (and as considered a standard situation). The reseat body (14) is kept in open position by the reseat spring (16) that acts against the flow direction. Should a gas consumption occur higher than the pre-set reseat flow, possibly due to a damage to the downstream gas pipe, or a downstream defective consumer, the force exercised by the reseat spring (16) is overcome by the increase of flow pressure and the reseat body (14) moves into its shut position, after which the gas supply is discontinued.

| List of reference numbers | |
|---|---|
| 1 | Casing |
| 2 | Inserting slope |
| 3 | Groove |
| 4 | Bore |
| 5 | Neck |
| 6 | Valve seat |
| 7 | Inlet guide |
| 8 | Outlet guide |
| 9 | Bearing |
| 10 | Collar |
| 11 | Pin |
| 12 | Bearing |
| 13 | Adjusting element |
| 14 | Reseat body |
| 15 | O-ring seal |
| 16 | Reseat spring |
| 17 | Spacer block |
| 18 | Stop point |
| 19 | Lock-in grid |
| 20 | Lip |
| 21 | Tappet |
| 22 | Spring |
| 23 | Locking piston |

-continued

List of reference numbers

| 24 | Mark |
| E1 | lock-in plane 1 |
| E2 | lock-in plane 2 |
| E3 | lock-in plane 3 |

What is claimed is:

1. Gas flow monitoring device to automatically shut off gas pipes, consisting of a gas-tight casing (1) with a valve seat (6) in its interior for a reseat body (14) that is movable inside the casing (1), with a pin (11) that acts as a guiding means to the reseat body (14), with an inlet guide (7) located in flow direction at the inlet inside the casing (1), with said inlet guide having a bearing (9) for the pin (11) and several collars (10) arranged in radial direction, with an outlet guide (8) located in flow direction at the outlet inside the casing (1), with said outlet guide having a bearing (12) for the pin (11) and several collars (10) arranged in radial direction, and with a reseat spring (16) that rests with its one end on the outlet guide (8) and with its other end on the reseat body (14) which is kept in open position by the spring force directed against the through-flow direction, and where flow through section, surface of reseat body (14) and forces are balanced in such a way that the reseat body (14) leaves its open position at a pre-defined value of the reseat flow and is moved towards the valve seat (6) of the casing (1) so that with the reseat body in shut position the gas pipe downstream of the gas flow monitoring device is shut off, characterised in that at the inlet guide (7) there is arranged a spacer block (17) that acts as a stop point (18) for the reseat body (14) with the gas flow monitoring device in open position and where the spacer block (17) is secured in its position by its lock-in grid (19) the locking elements of which catch and take hold behind the collars (10) of the inlet guide (7), and by the force of a spring (22) the one end of which rests on the side of the inlet guide (7) that faces away from the reseat body (14) and the other one that rests on the spacer block (17) itself.

2. Gas flow monitoring device according to one of the patent claims 1, characterised in that the spacer block (17) has resilient lips (20) assigned to each of the inlet guide's (7) collars (10) and in this way enable said collars (10) to trip, whereat the tappets (21) that also are specifically assigned to each of the inlet guide's (7) collars (10) prevent the same from being pushed out.

* * * * *